United States Patent [19]

Bednowitz

[11] Patent Number: 5,379,376
[45] Date of Patent: Jan. 3, 1995

[54] BI-DIRECTIONAL GRAPHICS ATTRIBUTE CONVERSION PROFILE

[75] Inventor: Allan L. Bednowitz, Mount Kisco, N.Y.

[73] Assignee: International Business Machines Corporation, Armonk, N.Y.

[21] Appl. No.: 533,198

[22] Filed: Jun. 4, 1990

[51] Int. Cl.⁶ .................................. G06F 15/62
[52] U.S. Cl. ........................ 395/162; 395/133; 345/154
[58] Field of Search ................ 395/129–132, 395/155, 162–166, 133, 200, 500; 345/1–5, 150, 153–155

[56] References Cited

U.S. PATENT DOCUMENTS 4,837,710  6/1989  Zelinsky et al. ............ 395/131
5,179,690  1/1993  Ishikawa ..................... 395/112

*Primary Examiner*—Almis Jankus
*Attorney, Agent, or Firm*—Jack M. Arnold; Ronald L. Drumheller

[57] ABSTRACT

A method and apparatus in which a single table is utilized to provide bi-directional conversion between a first graphics format such as a Computer Metafile (CGM) used on a personal computer, and a second graphics format such as a Graphics Data Format (GDF) used on a host computer. The table is accessed through the use of keywords and paired attributes of the respective graphic formats.

6 Claims, 10 Drawing Sheets

CGM⇌GDF Converter Facility
Bi-directional Attribute Conversion Profile

CGM Generated/Interpreted by PC Application

Binary Upload/Download to/from Host

Convert CGM to ADMGDF For GDDM Environment

Convert ADMGDF to CGM For PC Application Environment

Conversion Mediated by Attribute Profile

Example of Keywords and Paired Attributes:
CGM_COLOR_INDEX 3 5 2 6 1 7 1 0 ...
GDF_COLOR_INDEX 1 7 3 9 2 5 0 −2 ...

FIG. 1

CGM ⇌ GDF Converter Facility
Bi-directional Attribute Conversion Profile

Convert CGM to ADMGDF For GDDM Environment

Convert ADMGDF to CGM For PC Application Environment

CGM Generated/Interpreted by PC Application

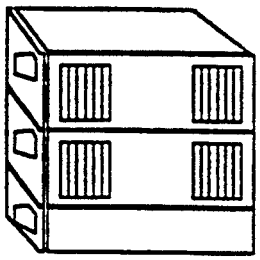

Binary Upload/Download to/from Host

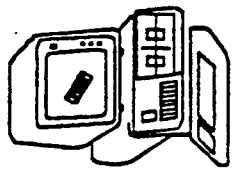

Conversion Mediated by Attribute Profile

Example of Keywords and Paired Attributes:
CGM_COLOR_INDEX 3 5 2 6 1 7 1 0 ...
GDF_COLOR_INDEX 1 7 3 9 2 5 0 -2 ...

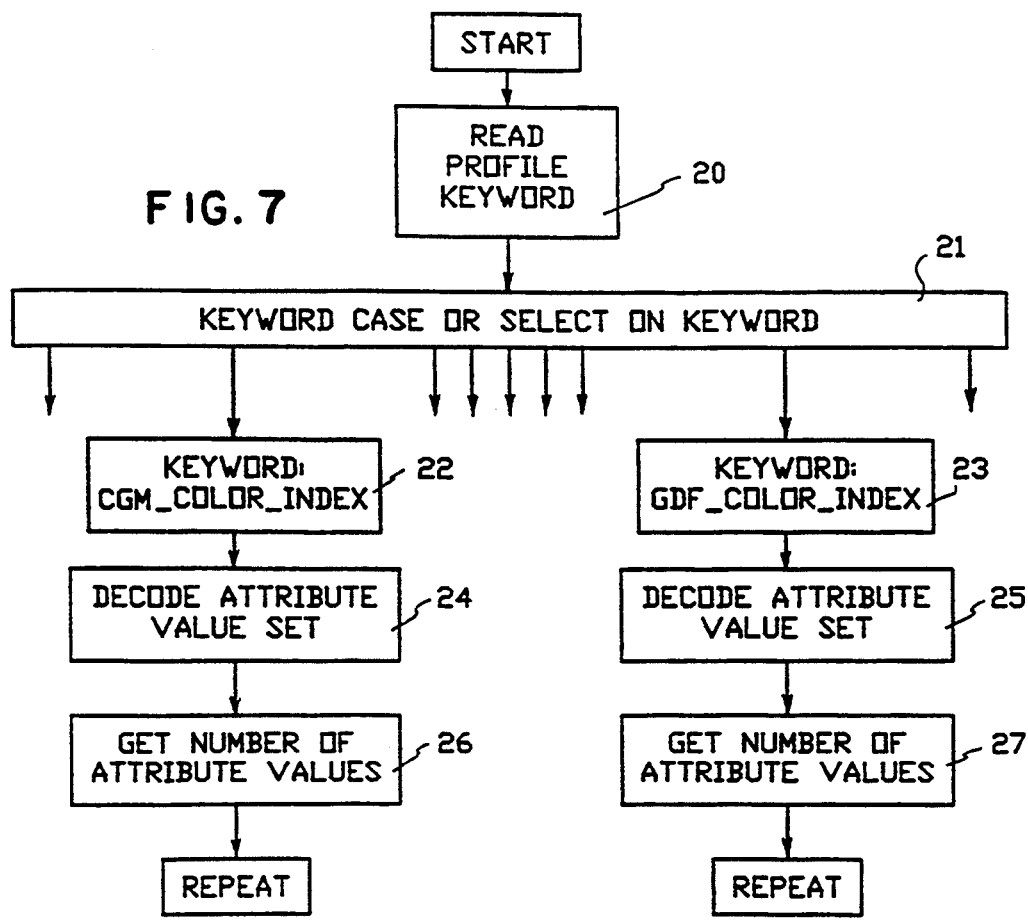

FIG. 8

```
* Example Conversion Profile
PICTURE_INFO_PARMS 0 0 4 2 1 0;
WINDOW_LIMITS 0 4096 32767 28672 ;    Note that any text following
LINE_WIDTH_FACTOR 1.0;                a semicolon is treated as a comment
MARKER_SIZE_FACTOR 1.0 ;
CGM_COLOR_INDEX    0  1  2  3  4  5  6  7  8  9 10 11 12 13 14 15;
GDF_COLOR_INDEX    8  7  1 12  2 10 16  3  5  6  4  7 15 14 13 11;
CGM_LINE          -2 -1  1  1  2  3  4  5  6  6  7;
GDF_LINE           5  2  7  0  5  1  3  6  0  8  4;
LINE_CONVERT_MODE  1  1  1  1  1  1  1  1  1  1  1;
CGM_MARKER        -1  0  1  2  3  4  5 -6 -7 -8 -9  0  0  3 -1  3  3 -9 -8  0;
GDF_MARKER        69  9 11 12 71 96 80 121 101 73 84  1  2  3  4  5  6  7  8 10;
MARKER_CONVERT_MODE 1  1  1  1  1  1  1  1  1  1  1  1  1  1  1  1  1  1  1  1;
CGM_PATTERN      -14 -13 -12 -11 -10  1  2  3  4  5  6  6  6  6  6  6  6  6  1;
GDF_PATTERN       11  7 14 12  5  8 11 12 14 13  6  0  1  2  3  4  9 10 15 16;
PATTERN_CONVERT_MODE 1 1  1  1  1  1  1  1  1  1  1  1  1  1  1  1  1  1  1  1;
CGM_FONT_NAME SWISS LIGHT SIMPLEX COMPLEX_ROMAN REEDISH DUPLEX_ROMAN
    COMPLEX_ITALIC SWISS TRIPLEX_ITALIC REEDISH_FIXED TRIPLEX_ROMAN
    GOTHIC_ENGLISH SIMPLE_RASTER SIGMA_MD20 COMPLEX_SCRIPT ;
CGM_FONT_INDEX   0  1  2  3  4  5  6  7  8  9 10 11 12 13;
GDF_FONT_INDEX 100 101 102 103 104 105 106 107 108 109 110 111 112 113;
GDF_FONT_NAME ADMUUTSS ADMUUSRP ADMUUCRP ADMUUMOD ADMUUDRP ADMUUCIP ADMUUKSF
    ADMUUTIP ADMUUNSF ADMUUTRP ADMUUGEP ADMUUORP ADMUUARP ADMUUCSP;
CHAR_WIDTH_FACTOR  1  1  1  1  1  1  1  1  1  1  1  1  1  1;
CHAR_HEIGHT_FACTOR 1  1  1  1  1  1  1  1  1  1  1  1  1  1;
```

FIG. 10

| KEYWORD DEDFAULTS | THESE ARE DEFINED SUCH THAT STANDARD LINES, MARKERS, COLOURS, ETC., IN ONE METAFILE MAP TO THE SAME OR SIMILAR ENTITIES IN THE OTHER. |
|---|---|
| KEYWORD | DEFAULT VALUES WHEN KEYWORD IS ABSENT FROM PROFILE |
| CGM_LINE | 1 2 3 4 5 1 1 1 |
| GDF_LINE | 7 2 1 3 6 0 4 5 |
| CGM_MARKER | 1 2 3 4 5 3 3 3 5 |
| GDF_MARKER | 9 2 6 10 1 3 4 5 7 8 0 |
| CGM_PATTERN | 1 2 3 4 5 6 1 1 1 1 1 1 1 |
| GDF_PATTERN | 10 9 11 13 12 14 0 1 2 3 4 5 6 7 8 |
| CGM_COLOR_INDEX | 0 1 2 3 4 5 6 7 8 9 10 11 12 13 14 15 16 17 0 1 3 9 10 11 12 13 14 <br> 15 16 |
| GDF_COLOR_INDEX | 8 7 2 4 1 6 3 5 8 7 2 4 1 6 3 5 8 7 -1 -2 0 9 10 11 12 13 14 <br> 15 16 |
| CGM_FONT_INDEX | 0 1 2 3 4 5 6 7 8 9 1 |
| GDF_FONT_INDEX | 100 101 102 103 104 105 106 107 108 109 0 |
| CGM_FONT_NAME | (NONE) |
| GDF_FONT_NAME | (NONE) |

FIG. 11

| CONVERSION DEFAULT VALUES | | |
|---|---|---|
| ATTRIBUTE | GDF CONVERSION DEFAULT | CGM CONVERSION DEFAULT |
| COLOUR | 7 | 1 |
| MARKER | 6 | 3 |
| LINE | 0 | 1 |
| PATTERN | 0 | 1 |
| FONT | 0 | 1 |

FIG. 12

| PICTURE ADJUSTMENT KEYWORDS |
|---|
| MNEMONIC/KEYWORD |
| PICTURE_INFO_PARMS |
| WINDOW_LIMITS |
| LINE_WIDTH_FACTOR |
| MARKER_SIZE_FACTOR |
| CHAR_WIDTH_FACTOR |
| CHAR_HEIGHT_FACTOR |
| LINE_CONVERT_MODE |
| MARKER_CONVERT_MODE |
| PATTERN_CONVERT_MODE |
| FONT_CONVERT_MODE |

BI-DIRECTIONAL GRAPHICS ATTRIBUTE CONVERSION PROFILE

TECHNICAL FIELD

The invention is in the field of computer graphics, and specifically is directed to the bi-directional conversion of a first graphics format to a second graphics format and vice versa.

PUBLISHED REFERENCES (1) American National. Standards Institute (ANSI) X3.122-1986 Metafile for the Storage and Transfer of Picture description Information. American National Standard—Computer Graphic Metafile, 1986.

(2) IBM Graphics Data Display Manager (GDDM) Base Programming Reference Vol. 2 SC 33-0332 Appendix D Gdf Order Descriptions, 1988.

(3) ISO 8632-1 International. Standard 1987-08-01 Metafile for the storage and Transfer of Picture Description Information, 1987.

(4) IBM GDDM Typefaces and Shading Patterns SC33-0554, 1988.

(5) Mil-D-28003 20 December 1988 Military Specification, Digital Representation for Communication of Illustration Data: CGM application Profile (6) Operating System/2 (OS/2) Extended Edition Version 1.2 Programming Reference Vol 1 Appendix D-2 1989. Operating System/2 and OS/2 are registered trademarks of the International Business Machine Company.

(7) IBM System 370 Principles of Operation GA22-7000-6, 1980.

(8) IBM Virtual Machine/System Product General Information GC20-1838, 1984.

(9) IBM GDDM Installation and System Management for VM SC33-0323 1988.

(10) IBM GDDM Installation and System Management for MVS SC33-0321 1988.

(11) IBM Personal System/2 Graphics Workstation Program SC33-0574, 1988.

(12) Personal Computer AT Guide to Operations PN6139339, 1985.

(13) IBM PS/2 Model 80 Quick Reference PN 84×1529, 1987.

The above referenced publications are incorporated herein by reference as providing information relative to the different computers, computer programs and graphic formats that may be utilized in the practice of the invention.

BACKGROUND OF THE INVENTION

The use of PC-based graphics packages has become widespread. Unfortunately, it has been difficult to use their output on host based printers. For example, it is often desirable to include graphic output in Document Composition Facility (DCF) (Script) documents. Or it might be required to use a host connected color printer. One solution is to use a graphics data interchange metafile format which is subsequently converted to a host based Graphics Data Display Manager (GDDM) graphics file format. This metafile format is available as the Computer Graphics Metafile (CGM) which is a standard graphics data interchange file (ANSI X3.122, ISO 8632-1). It is available for export and import with many PC graphics applications (e.g., Freelance Plus, Harvard Graphics).

Converting a CGM to a Graphics Data Format (GDF) (IBM GDDM Graphics Data File) while conceptually straightforward becomes complex as one focuses on details. As an example consider the conversion of one graphic attribute, color. The color attributes in both graphics metafiles can be specified by integer index values, however, GDDM defines only 18 values including neutral, background, true black and true white, whereas, the CGM index values can vary up to 32K (maximum positive integer at 16 bit color index precision) with the values being defined by RGB (red, green, blue) coordinates. For some applications the range of color index values is small (12 for Freelance Plus), while in others it can be large, with many shades, tints and hues possible.

As the CGM usually contains sufficient information to determine the CGM origin one could code unique color index conversion procedures for each application. Given the wide range of available applications and the possibility of color modification in each application this soon becomes futile. One solution is to open the color attribute conversion process to the user by using a conversion profile customizable for the application. This could be as simple as a straight-forward look-up table. In fact, early versions of the CGM to GDF and GDF to CGM converters did exactly that. Unfortunately the same table does not suffice for conversion in both directions, as the mapping is not always 1 to 1. The same situation exists for most other graphic attributes such as line type, hatch patterns, markers, and even in some respects with fonts. An attribute conversion profile table circumvents many of the problems. However, different profiles for each conversion direction for each application run into coordination problems when converting back and forth between GDF and varying CGM generator/interpreter applications.

According to the present invention, a single bi-directional graphics attribute conversion profile is utilized to mediate in the conversion process for each application. The conversion profile consists of keywords and free form attribute arrays.

DISCLOSURE OF THE INVENTION

A computer graphics system in which a single table is utilized to provide bi-directional conversion between a first graphics format such as a Computer Graphics Metafile (CGM) used on a personal computer, and a second graphics format such as a Graphics Data Format (GDF) used on a host computer. The table is accessed through the use of keywords and paired attributes of the respective graphic formats.

BRIEF DESCRIPTION OF THE DRAWINGS

FIG. 1 is a diagram of a bi-directional attribute conversion process according to the invention;

FIG. 7 is a flow chart of how attribute profiles are identified and determined;

FIG. 8 is a bi-directional table for a conversion profile according to the invention;

FIG. 9 is a table illustrating attribute conversion keywords;

FIG. 10 is a keyword default value table;

FIG. 11 is a conversion default values table; and

FIG. 12 is a picture adjustment keywords table.

BEST MODE FOR CARRYING OUT THE INVENTION

Figure 2:
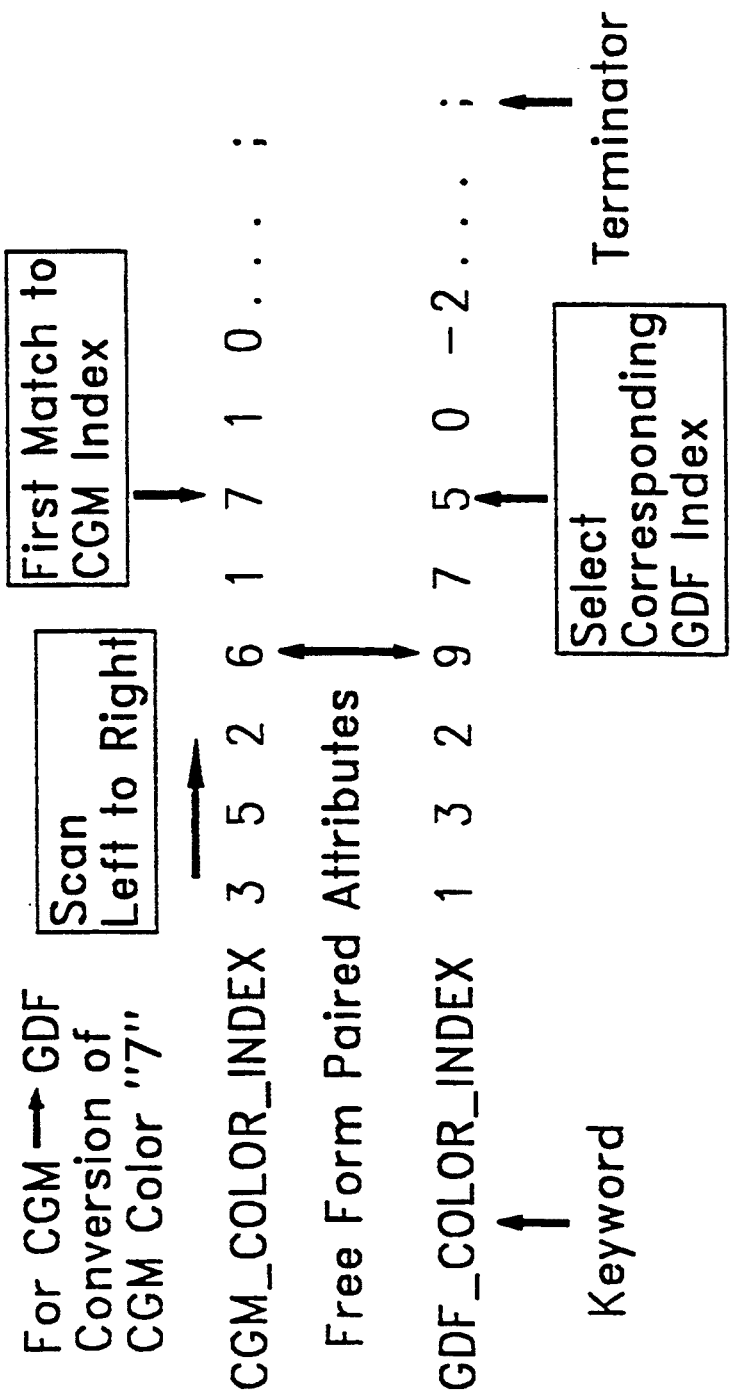
FIG. 2 is a diagram of the bi-directional attribute conversion profile for CGM to GDF color conversion.

The invention is described relative to a bi-directional conversion between a first graphics format such as a CGM used on a personal computer, and a second graphics format such as a GDF used on a host computer. It is to be appreciated that the principles of the invention are also directed to, other computer configurations and other graphic formats. Also, a single computer may be utilized to provide bi-directional conversion between a first graphics format for a first type of application running on the computer and a second graphics format for a second type of application running on the computer.

Converting from CGM to GDF and/or GDF to CGM requires mediation in the translation of graphic attributes such as color, line type, fill patterns fonts, and markers. This invention defines a Custom Bi-directional Graphic Attribute Conversion Profile which mediates the conversion process for each application. The Conversion Profile consists of keywords and free form attribute value arrays.

The conversion process for CGM to GDF and GDF to CGM is mediated by the Attribute Conversion Profile for each application. The process under consideration is indicated in FIG. 1, and is explained in more detail shortly.

The attribute conversion profile consists of keyword identifiers and free form attribute value arrays. The conversion of at least the following attributes are mediated:

Color
Line Type
Marker Type
Fill Pattern/Hatch
Font Type
Font Name
Text Attributes In addition, at least several adjustment factors are available:

Picture Info Parms
Window Limits
Line Width Factor
Marker Size Factor
Character Width Factors
Character Height Factors
Line Type Convert Mode
Pattern Convert Mode The conversion attributes come in pairs, one set of values for the CGM and a second for GDF. The index values match by position in their respective arrays. The arrays are scanned from left to right for the first match. The corresponding index in the coupled array is used for the output attribute value. The array keywords are prefixed by either "GDF_" or "CGM_". For CGM to GDF conversion the "CGM_" array is scanned for a match. For GDF to CGM the "GDF_" array is scanned for the first match.

Most of the items in the conversion profile have default values and the keyword records are optional. The sequence of keywords is also optional as is the sequence of the index pairs, except for the coupling requirement.

The Character Width and Height adjustments correspond in position to their respective Font Names and Font Index value. That is, each font can have its character box height and width adjusted by an individual tuning factor. This assists in matching the appearance of converted character strings as character aspect ratios can differ from font to font.

The Line Width, and Marker Size are single overall values for adjusting their respective attributes.

The Window limits allow the specification of the user coordinate range to override the CGM Virtual Device Coordinate Extent (VDC Extent). It allows additional flexibility for zoom and crop.

The Line Type and Pattern Convert Modes control the mode of conversion. They specify either (0) stroke out the line/pattern or (1) use the CGM index values as specified in the coupled arrays. The use of either mode depends on the necessity for conciseness or exact replication. For example, there is no double dot line type in most CGM interpreters. If desired, it can be emulated by stroking out the short dots (at great cost).

Each array is terminated by a ";" character. The arrays can be continued on multiple records up to a maximum item count. Thus one should be able to explicitly map many CGM color index values onto the 18 GDDM values (including "−1" and "−2" GDDM index for Black and White).

The Picture Info Parms contains parameters that control:

1. Starting picture number or specification font all pictures.
2. Starting GDDM segment number.
3. Specify method of loading the CGM into the GDDM Graphics Field.
4. Other conversion control parameters as required.

This Bi-directional Profile can also be useful for converting between CGM and other graphic metafile formats such as Picture Interchange Format (PIF), Presentation Manager Metafile (PMM) or any other graphics metafile format. The color attribute conversion profile can also be used for conversion from GDF to lasergraphics Language for the Matrix QCC/QCR camera. Hence, use of this concept is not restricted to CGM conversion.

Graphical objects require specification of their attributes for display, printing or conversion to alternate file formats.

One method of attribute specification is to indicate an integer index representing a quality or group qualities. For example, color may be specified by index which represents a color description Red Green Blue (RGB), Cyan Yellow Magenta (CYM), or Hue Lightness Saturation (HLS) in a standard color coordinate system. This technique is used pervasively and is the state of the art in graphic metafile formats (see references 1,2,3 & 4). To convert from one metafile format to another requires knowledge the definitions applied to these index values in both formats. The equivalence can be stated in the form of a conversion table as is commonly done with character encoding conversion schemes such as ASCII to EBCDIC.

The problem with this straight forward technique in the graphics metafile situation is that the standard CGM (Computer Graphics Metafile) (Ref 1 & 3) is very flexible with regard to application dependant definitions of the attribute index values. Thus, some means of specifying the conversion of attribute values in a customizable fashion is required. This invention addresses the problem with a Bi-Directional Graphic Attribute Conversion Profile.

Each attribute is assigned a keyword label, for the associated metafile. Using the color attribute as an example along with the CGM standard and IBM GDDM GDF (Graphic Data Format in Ref 2.) there is shown in FIG. 1. the following two keywords:

CGM_COLOR_INDEX
GDF_COLOR_INDEX

A table is constructed of associated pairs of attribute index values in appropriate order. That is, index "3" of CGM is paired with index "1" of GDF; index "5" of CGM is paired with index "7" of GDF and so on. The order need not be sequential, but, should be appropriate for the search/match technique.

Given a CGM color index "i" the CGM_COLOR_INDEX value set is scanned in a single direction (conceptually left to right) until a match is found. The GDF_COLOR_INDEX "j" is the associated index in the same sequential position.

Refer to FIG. 2 for an example of CGM to GDF color conversion. CGM color index "7" is to be converted to the matched or paired GDF color. The CGM attributes are scanned left to right until the index "7" is reached. The corresponding or paired GDF index "5" is selected for the conversion.

Figure 3:
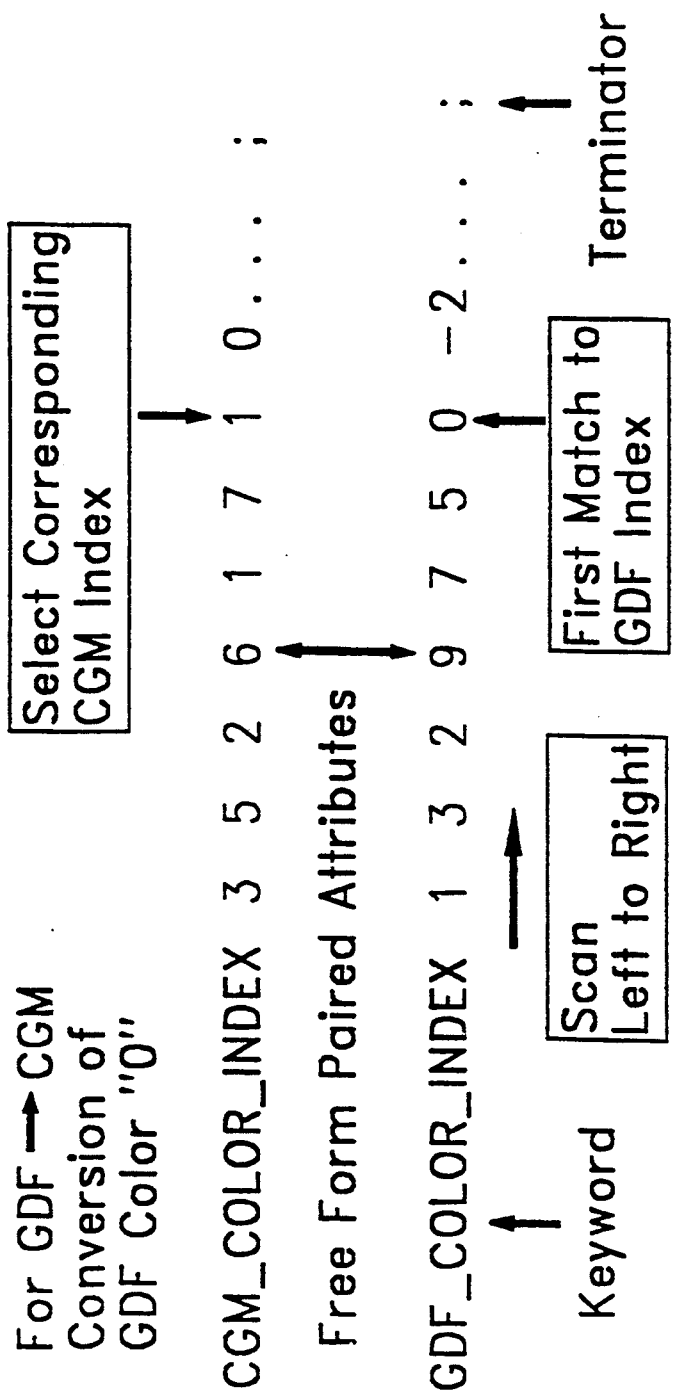
FIG. 3 is a diagram of the bi-directional attribute conversion profile for GDF to CGM color conversion.

Refer to FIG. 3 for the complementary example of GDF to CGM color conversion. GDF color index "0" is to be converted to the matched or paired CGM color. The GDF attributes are scanned left to right until the index "0" is reached. The corresponding or paired CGM index "1" is selected for the conversion.

The conversion profile need not be one to one, as many different CGM values can map to a single GDF index. Similarly many GDF index values can map to the same CGM index. Yet, for each CGM index there is one unique GDF index found by the unidirectional scan. Conversely for each GDF index there is one unique CGM corresponding index. While this technique is designed specifically for the conversion of arbitrary CGM graphics to the GDF format it can also be applied to other graphic metafile formats such as the OS/2 Presentation Manager Metafile format to CGM conversion.

While the source of the CGM file is often an application running on a workstation or PC it may also be an application running on a mainframe computer (For example see APGS). Usually the mainframe computer is the source or recipient of the GDF in the form of GDF data.

Description of Flowcharts

Figure 4:
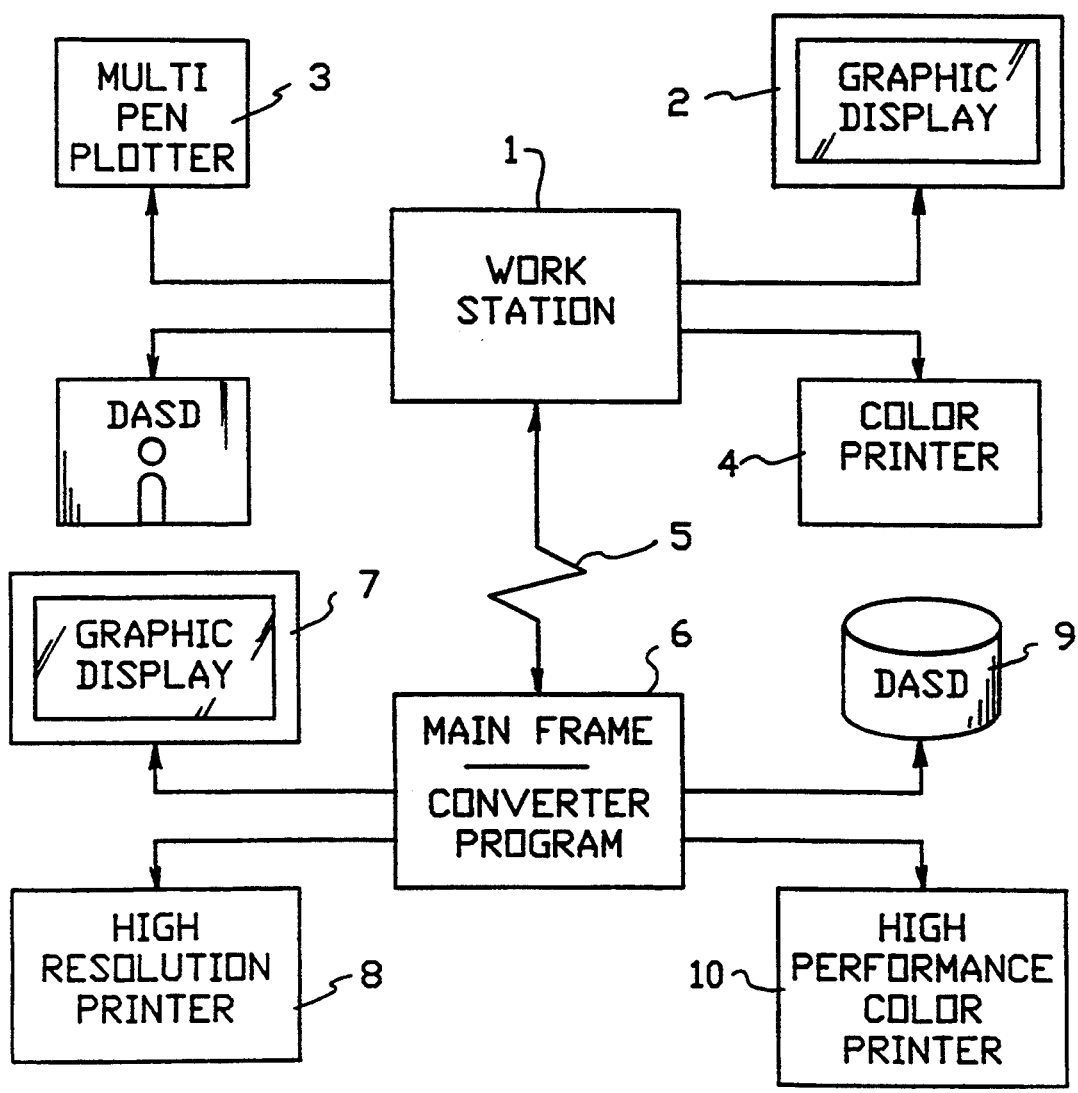
FIG. 4 is a block diagram of a computer system in which the bi-directional graphic format conversion method and apparatus of the present invention may be included.

FIG. 4 illustrates an exemplary computer system in which the invention may be practiced. The CGM is generated on a workstation 1 by a graphics application program with the ability to export metafiles. The workstation 1, for example, may be an IBM Personal. System 2 (PS/2) computer, the operation of which is described in "PS/2 Hardware interface Technical Manual Reference" IBM Publication order number 68X-2330-0. Personal. System/2 and PS/2 are each registered trademarks of International. Business Machines Company. The CGM can be displayed by its applications CGM interpreter on a graphic display 2 or uploaded via link 5 to a mainframe computer 6 for interpretation, conversion and display on a host graphics terminal 7. The host computer for example, may be an IBM System/370 computer, the operation of which is described in "IBM System/370 Principles of Operation", IBM publication order number GA22-7000-6, 1980. The host computer 6 is shown as including the bi-directional attribute conversion profile program, however it is to be appreciated that the program could be designed to alternatively run at the workstation 1. Local workstation hardcopy can be obtained on a monochrome or color graphics printer 4 or with the aid of a multipen plotter 3. All this presupposing the availability of appropriate software on the workstation. Alternately a GDF could be generated by appropriate software on the mainframe computer 6, stored in DASD 9, displayed on display 7 and shared with many other users directly or through high quality printer output such as printers 8 and 10. Relative to the hardcopy capability of devices attached to the users workstation, the facilities available through the mainframe may be expensive, but, desirable for esthetic reasons. As the GDF format is supported and widely used on mainframe computers, while the CGM format is widely used and supported on workstations it becomes vital to have a flexible mechanism of converting between the two metafile formats.

It is often the users personal preference that decides the location of the graphics application program that is generating the metafile. While high quality printers are often attached to mainframe computers, software exists on mainframe computers to provide hardcopy via the GDF metafile route. Desirable multipen plotting devices are connected to and supported by CGM based software on workstations. On workstations software exists to interpret and provide hardcopy via the CGM route.

The potential exists for creation of a CGM or GDF on one system in one metafile format with a desire to output hardcopy on a device connected to the alternate system. While there are other metafile formats in use that could also be considered, this invention was developed to meet the needs of GDF_—_CGM bi-directional conversion of graphic attributes.

The CGM_—_GDF Conversion Process

Figure 5:
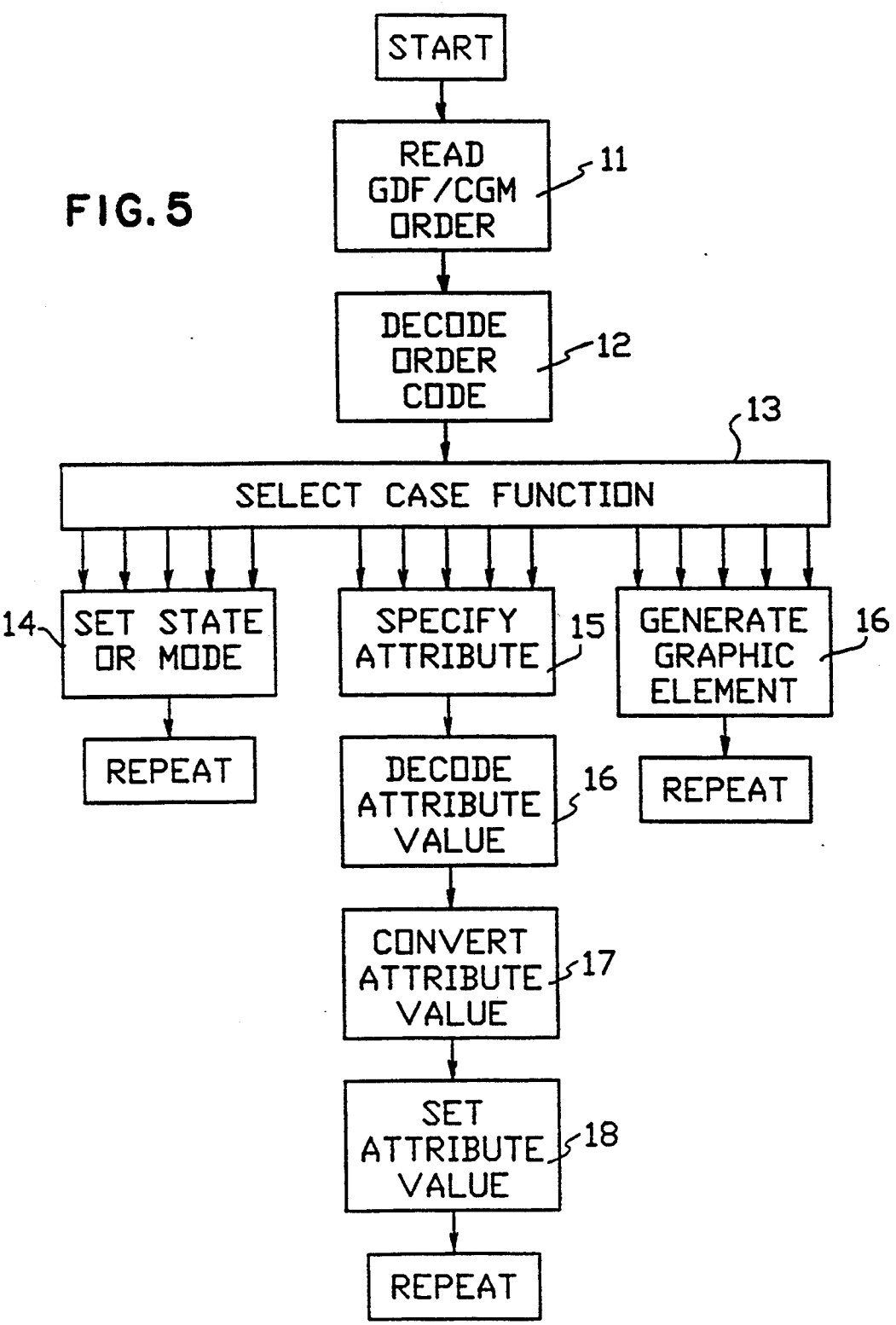
FIG. 5 is a flow chart of the bi-directional graphic format conversion.

FIG. 5 is a flowchart of both GDF to CGM and CGM to GDF conversion. The CGM or GDF order is read from DASD in block 11. The set of GDF orders is described in reference 2. The set of CGM "orders" is described in references 1 and 3. For this implementation the CGM is assumed to be in CGM Binary encoding. GDF orders are available only in a binary format. Nothing in the novel features of this invention precludes its use with the CGM clear text or character encoding as it applies to attribute conversion independent of encoding.

The "order code" is decoded in block 12 and a "Select" or "Case" function 13 distributes control to the proper processing block. The individual processing blocks are grouped by their schematic type in FIG. 5, blocks 14, 15 & 16. The "Set State" or "Mode" orders are represented by block 14. The attribute Specification orders are represented by block 15 and the Graphical Element generation orders by block 16. Each of these three types can be subdivided further into individual functions for the actual conversion process. Focusing on block 15 and the attribute specification process, the actual attribute value is decoded in block 16. Once the attribute index value is obtained it must be converted to the appropriate complementary attribute value in block 17 for the alternate metafile. The last step in this process is setting the attribute state in the converted metafile as in block 18 before repeating the order read in block 11.

Converting the Color Attribute Value

Figure 6:
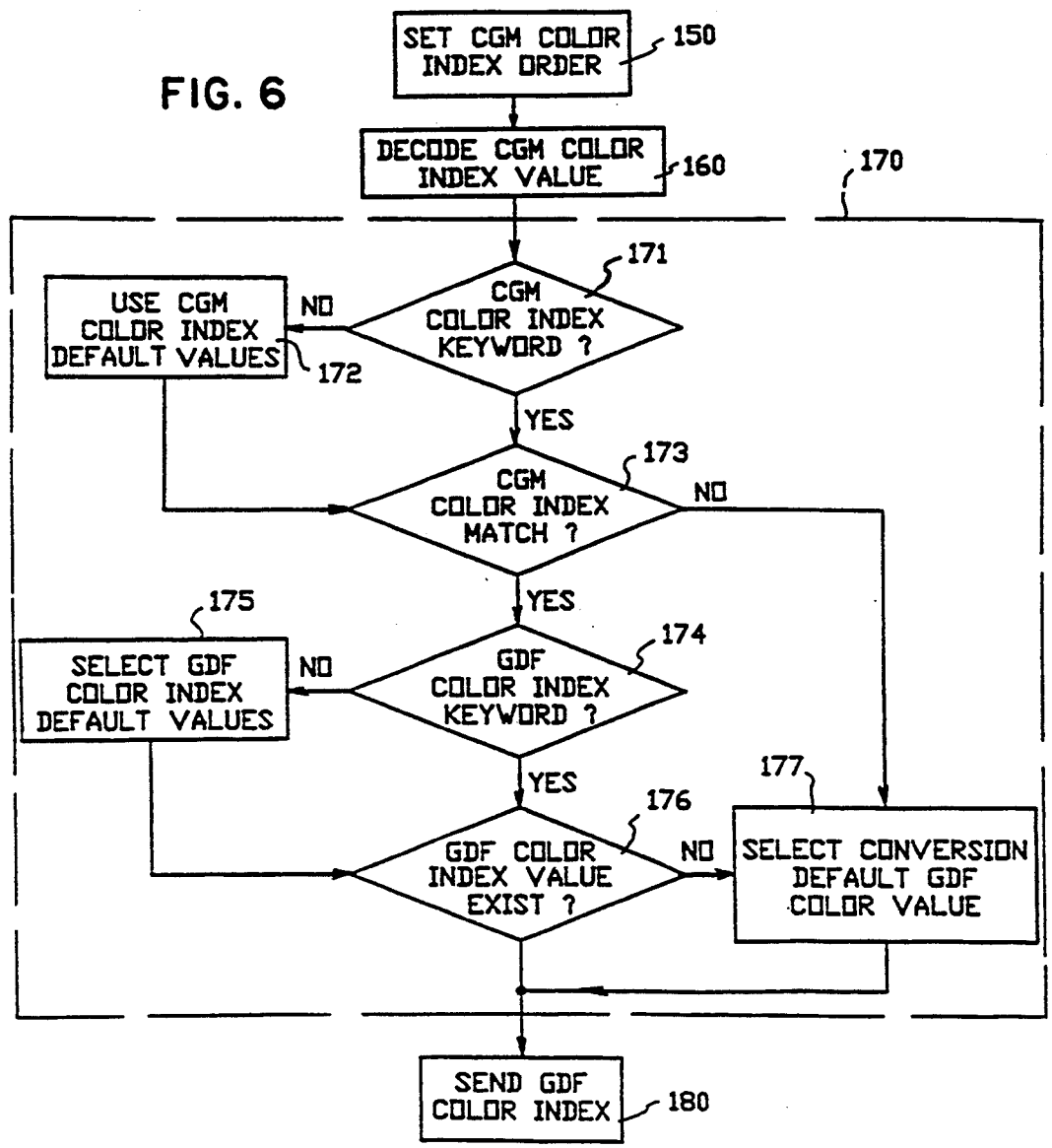
FIG. 6 is a flow chart including greater detail of block 17 of FIG. 5.

FIG. 6 shows a detailed flow chart of the conversion process for one attribute (Color) during the CGM to GDF conversion. The reverse process requires the same schematic chart, with the GDF and CGM designations interchanged. Block 150 is an example of the Set Color Index CGM order. Block 150 is equivalent to block 15 in the general schematic in FIG. 5. Similarly block 160 is a specific example with respect to the color attribute for block 16 in FIG. 5. The equivalent of block 17 in FIG. 5 is indicated by the dashed box 170 in FIG. 6.

Decision block 171 within block 170 indicates an existence test for the keyword CGM_COLOR_INDEX in the Bi-Directional Graphics Attribute Conversion Profile. A default set of color index values is used if the keyword record is not found or has no entries. If the CGM_COLOR_INDEX keyword does not exist, control passes to block 172 and a default CGM color index value is used. Control is then passed to block 173. If the CGM_COLOR_INDEX keyword exists and the attribute value set has more than zero elements then control passes to block 173 which is a scan of the color attribute value set for a matching index. If no match is found then control passes to block 177 where a default GDF color index value is selected. Control then passes to block 180 and the appropriate GDF order to set the GDDM color index is generated. If, however, in block 173 a match is found for the current CGM color index value then its sequential position is saved and control passed to block 174. Block 174 is an existence test for the GDF_COLOR_INDEX keyword. If this keyword is not found in the attribute conversion profile then the GDF color index default set is used. Control passes to block 176 in either case and the existence of a complementary GDF color value is passed to block 180. Alternately, if the GDF color index value is not explicitly in the set then the conversion default is passed to block 180. The GDF color index is set in block 180, which is equivalent to the general schematic block 18 in FIG. 5.

At this point the appropriate color index value has been placed in the output Metafile.

The description of the conversion process for attributes such as line_type, marker type and pattern type are identical to that for color except for the length or content of the attribute sets.

Analysis of the Conversion Profile

The conversion profile is analyzed early in The Conversion Process. FIG. 7 indicates the process whereby the sets of attribute values are identified and determined. In block 20 of FIG. 7 the attribute profile is read and each keyword is selected in turn. Using the Select function the keyword is matched to its associated processing block, as for example, block 22 in FIG. 7. As the CGM_COLOR_INDEX values are integers the set is read, decoded and saved in Block 24. The number of values is set in block 26 and the process repeated at block 20 until the end of the attribute file is reached. GDF_COLOR_INDEX values are processed in a like manner in blocks 23, 25 and 27.

CGM File Format

CGM files used as input to the converter facility may be in fixed or variable record format with an arbitrary record length no more than 8000 bytes. CGM files created by the GDF to CGM converter are of fixed format and 400 byte record length.

Format of the Conversion Profile

The way in which graphics orders are converted from CGM to GDF and from GDF to CGM is controlled by the bi-directional attribute Conversion Profile. The same profile is used for conversion in either direction.

The conversion profile is a free format file which consists of:
  lines containing specified keywords followed by their parameters
  continuation lines (where the previous line contained an incomplete keyword/parameter sequence)
  comment lines (those starting with a "*").

The content of a conversion profile can be in mixed, lower or upper case, and leading blanks are not significant. Keywords are followed by their parameters, and they are terminated by a semicolon. Any text following the semicolon until the end of the line is treated as a comment. An example is given in the table of FIG. 8.

The information specified in the conversion profile is of two types:
  attribute information, which specifies how fonts, lines, patterns, etc. are mapped during conversion.
  adjustment factors, which define various adjustments necessary to allow for differences in CGM files from different sources.

The conversion profile is an F-format or V-format file with an LRECL no longer than 256.

FIG. 9 shows the allowed attribute keywords. There are two of each type and they are usually specified in pairs, though the order is immaterial. During a GDF to CGM conversion, the parameter of the GDF order requiring conversion (e.g. line type) is searched for in the parameters to the appropriate GDF keyword (i.e. GDF_LINE) and the position in the parameter list of which it is found defines the index of the parameter to the CGM keyword which is taken as the new value.

If the parameter appears more than once in the parameter list, the first occurrence is the one taken.

Although the keyword prefix "GDF" is used, the parameters to these keywords correspond to GDDM API call parameters and not to their encoded form in the GDF orders.

Attribute information is subject to the following rules:
1. Keyword parameters can be continued on multiple lines up to a parameter count of 256.
2. If the same keyword appears more than once in the conversion profile, the final specification is the one that is used.
3. If a keyword is missing (either a pair or one of a pair) then the keyword default values are used for the missing parts. These are defined in FIG. 10.
4. The two keywords of a pair need not appear together in the version profile, but it aids readability if they do.
5. If one keyword of a pair has less parameters supplied than the other, the shorter is considered to be padded with the corresponding conversion default value to the required length. The conversion default values are defined in FIG. 11.
6. If a value in the input order stream is not found in the corresponding keyword parameters, the value inserted in the output order stream is the conversion default for the target format.
7. If a value is not specified in the input order stream and it is required to be generated in the output order stream, the value inserted in the output is the GDF conversion default for CGM→GDF conversion. For GDF→CGM conversion a value of 0 is assumed in the input stream, and this is then mapped to the appropriate CGM value using the attribute information.
8. The GDDM default value (0) can be used as a GDF keyword parameter and is processed in the same way as any other value.

Marker: On CGM to GDF conversion, marker values in the CGM input may be mapped to either the system or user defined markers of GDDM.

On GDF to CGM conversion, markers may be mapped or stroked out under control of the MARKER_CONVERT_MODE. If stroked out, they are converted to vector form.

Pattern: The term "pattern" in this context refers to Both GDDM patterns and CGM hatches which approximately correspond to each other. The precise way that GDF patterns are mapped to CGM is as follows:

| GDF Pattern Number | CGM Elements Generated |
| --- | --- |
| 15 | area with interior style = 4 (i.e. empty) |
| 0,16 | area with interior style = 1 (i.e. solid) |
| other values | area with interior style = 3 (i.e. hatch) |

Hence, most GDF pattern values map to CGM hatch values, and vice versa, except for 0, 15 and 16, which map to hollow and solid areas.

Color Index: CGM indexed color (without a color table definition) and GDDM color are mapped to each other in the standard way with the modification that the default values are cyclical. These defaults are defined such that colors in one standard convert to similar colors in the other, using the MIL_D_28003 spec of reference 5 for indexed color, except for colors 0 and 1 for which the CGM defaults of black and white are used.

On CGM→GDF for CGM indexed color, any color table given in the metafile is ignored, except where the resultant GDF_COLOR_INDEX value is 0. In this special case, the resultant color is the closest match in the GDDM colors 0–16 to the color table's RGB value.

For CGM direct color, RGB values are approximated to the closest match in the GDDM colors 0–16, except where the RGB value is used in an area fill, when its closest match in the GDDM 64 color pattern set is used.

On GDF→CGM a color table is placed in the metafile and entries are selected according to the COLOR_INDEX values in the conversion profile.

Font Index and Font Name: Fonts (symbol sets) are handled in a special way using four picture mapping keywords and the FONT_CONVERT_MODE adjustment factor.

On GDF to CGM conversion, if any FONT_CONVERT_MODE is 0, the corresponding font is stroked out to vectors if the font is available in vector form. If FONT_CONVERT_MODE is 1, or the font is not available in vector format, then the following font mapping process is used:

the GDF_FONT_NAME (i.e. the symbol set name) is looked up in the GDF_FONT_NAME list and its position determines the CGM_FONT_INDEX and CGM_FONT_NAME to use in the converted file.

On CGM to GDF conversion,
the CGM font index used in the metafile is looked up in the CGM_FONT_INDEX list. The position of this then determines the GDF_FONT_NAME and GDF_FONT_INDEX to use in the output GDF order stream.

The example given below contains the FONT_NAME values which are supplied in the general purpose conversion profile, as there are no defaults in FONT_NAME.

CGM_FONT_INDEX 0 1 2 3 4 5 6 7 8 9 1;
GDF_FONT_INDEX 100 101 102 103 104 105 106 107 108 109 0;
GDF_FONT_NAME ADMUUTSS ADMUUSRP ADMUUCRP ADMUUMOD ADMUUDRP
ADMUUCIP ADMUUKSF ADMUUTIP ADMUUNSF ADMUUTRP ADMDVECP

The above matches the requirements of the MIL-D-Spec of reference 5 (the CGM standard does not specify font names).

On LGM→GDF, if there is no valid GDDM font name in the conversion profile corresponding to the chosen GDDM local character set id or the character set does not exist, then a default font is used. If the LCID is <65 then the device default font is used.

Picture Adjustment Factors

Several adjustment factors listed in FIG. 12 may also be specified in a conversion profile.

PICTURE_INFO_PARMS: The Picture_Info_Parms record is optional and where used supplies defaults for the CGM to GDF or GDF to CGM conversion process.

WINDOW_LIMITS: The Window Limits allow the specification of the GSUWIN call to override the CGM Virtual Device Coordinates (VDC). This only has an effect on CGM to GDF conversion and is used to overcome the problem that CGM files from certain applications use only a small fraction of the VDC range that they define. Window_limits effectively allows a limited zoom and crop capability. This is ignored on GDF to CGM conversion.

There are always four window parameters: Xmin Ymin Xmax Ymax. These are used in the following GDDM call:

CALL GSUWIN (Xmin,Xmax,Ymin,Ymax);

This call defines the graphics window for scaling and clipping. If this record is absent the window defaults first to the CGM Virtual. Device Coordinate Extent (VDC Extent). If the VDC Extent is not defined in the CGM file then the overall default is used, as in the following call

CALL GSUWIN (−32768, 32767, −32768, 32767)

This call to GSUWIN provides a window of 1:1 aspect ratio to maintain the aspect ratio of the CGM picture. The resultant GDDM picture is slightly modified depending on the aspect ratio of the picture space and viewport. The CGM window frame is adjusted to fit into the GDDM viewport or picture space while maintaining the same aspect ratio. The default viewport and default picture space are device dependent.

LINE_WIDTH_FACTOR: This takes a single parameter which is used to adjust widths of all lines in all linetypes. The default is 1.0.

LINE_WIDTH_FACTOR is used as a divisor in the direction CGM→GDF and a multiplier in the reverse direction. The CGM line Width value is divided by this parameter to obtain the GDDM Line Width Value.

MARKER_SIZE_FACTOR: This takes a single parameter which is used to adjust sizes of markers of all marker types. It is analogous in operation to LINE_WIDTH_FACTOR. The default value is 1.0.

CHAR_WIDTH_FACTOR: The character width & height adjustments correspond in position to their respective Font Names and Font Index value. That is, each font can have its character box height and width adjusted by an individual tuning factor. This assists in matching the appearance of converted character strings as character aspect ratios can differ from font to font.

CHAR_HEIGHT_FACTOR: See above.

LINE, PATTERN, FONT AND MARKER_CONVERT_MODE: These each have the same number of parameters as the corresponding CGM_ or GDF_ keyword, each of which should be 0 or 1. On GDF→CGM conversion, these control whether lines, patterns and fonts should be stroked out (when 0) or converted to corresponding CGM index values (when 1). On CGM→GDF conversion, lines, patterns markers and fonts are never stroked out.

If a convert mode keyword is not specified, a default value of 0 is assumed for each conversion. If there are less parameters supplied than on the corresponding CGM_ or GDF_ keyword, missing values are assumed to be 0. If a convert_mode keyword is not specified the default values used are zeroes, i.e. the corresponding primitives are stroked out.

Stroked out mode (0) should be used when one wants an exact replication of the original picture at the expense of generating many short vector orders, resulting in a larger graphics file. Non-stroked out mode (1) should be used when one is concerned with generating a concise file and when one intends to edit the converted file. As an example consider the double dot line type which does not exist in CGM. If desired, it can be emulated by stroking out the short dots (at considerable cost in terms of processing time and file size).

INDUSTRIAL APPLICABILITY

It is an object of the invention to provide an improved graphics format conversion system.

It is another object of the invention to provide a graphics format conversion system utilizing a table which is accessed through the use of keywords and paired attributes of the respective graphic formats.

It is still another object of the invention to provide a bi-directional graphics format conversion system.

It is yet another object of the invention to provide a bi-directional conversion between a first graphics format for a first type of application and a second graphics format for a second type of application used on a computing system.

It is still yet another object of the invention to provide a bi-directional conversion between a first graphics format used on one type of computing system and a second graphics format used on a second type of computing system.

It is a further object of the invention to provide a bi-directional conversion between a first graphics format for a first type of application and a second graphics format for a second type of application utilized on a computing system, utilizing a table which is accessed through the use of keywords and paired attributes of the first and second graphic formats.

It is yet a further object of the invention to provide a bi-directional conversion between a first graphics format used on a first type of computing system and a second graphics format utilized on a second type of computing system, utilizing a table which is accessed through the use of keywords and paired attributes of the first and second graphic formats.

I claim:

1. In a computer system, the combination comprising:
   a first computer which utilizes a first graphics format for transmitting and receiving graphics information;
   a second computer which utilizes a second graphics format, which is different than said first graphics format, for transmitting and receiving graphics information; and
   bi-directional graphic format conversion means for converting said first graphics format to said second graphics format and for converting said second graphics format to said first graphics format, for transmission of graphics information from said first computer to said second computer and for transmission of graphics information from said second computer to said first computer,
   wherein said bi-directional format conversion means comprises:
     an attribute profile for at least two graphic formats, with said attribute profile including for each of a plurality of attributes for each of said at least two graphic formats: a prefix indicative of the graphic format, a keyword indicative of the attribute, and an index of a plurality of attribute parameters associated with the keyword, with each such attribute parameter of a first graphic format being paired with an attribute parameter of a second graphics format;
     means for selecting a predetermined attribute parameter of said first graphics format for conversion to said second graphics format;
     means for scanning said attribute parameters of said first graphics format until the predetermined attribute selected for conversion is found; and
     means for selecting the attribute parameter of said second graphics format that is paired with the predetermined attribute selected for conversion to said second graphics format, as a converted attribute.

2. The combination claimed in claim 1, wherein said attributes are selected from a group including:
   (a) color
   (b) line type
   (c) marker type
   (d) fill pattern/hatch
   (e) font type
   (f) font name
   (g) text attributes.

3. In a computer system, the combination comprising:
   a computer;
   a first application running on said computer which utilizes a first graphics format for transmitting and receiving graphics information;

a second application running on said computer which utilizes a second graphics format, which is different than said first graphics format, for transmitting and receiving graphics information; and bi-directional format conversion means for converting said first graphics format to said second graphics format and for converting said second graphics format to said first graphics format, for transmission of graphics information from said first application to said second application and for transmission of graphics information from said second application to said first application, wherein said bi-directional format conversion means comprises:

an attribute profile for at least two graphic formats, with said attribute profile including for each of a plurality of attributes for each of said at least two graphic formats: a prefix indicative of the graphic format, a keyword indicative of the attribute, and an index of a plurality of attribute parameters associated with the keyword, with each such attribute parameter of a first graphic format being paired with an attribute parameter of a second graphics format;

means for selecting a predetermined attribute parameter of said first graphics format for conversion to said second graphics format;

means for scanning said attribute parameters of said first graphics format until the predetermined attribute selected for conversion is found; and means for selecting the attribute parameter of said second graphics format that is paired with the predetermined attribute selected for conversion to said second graphics format, as a converted attribute.

4. The combination claimed in claim 3, wherein said attributes are selected from a group including:

(a) color
(b) line type
(c) marker type
(d) fill pattern/hatch
(e) font type
(f) font name
(g) text attributes.

5. A method of operating a computer system, comprised of a first computer which utilizes a first graphics format for transmitting and receiving graphics information; a second computer which utilizes a second graphics format, which is different than said first graphics format, for transmitting and receiving graphics information; a bi-directional graphic format conversion table for converting said first graphics format to said second graphics format and vice versa, for transmission of the converted graphics information between said first and second computers, with said bi-directional format conversion table including an attribute profile for at least two graphic formats, with said attribute profile including for each of a plurality of attributes for each of said at least two graphic formats: a prefix indicative of a graphic format, a keyword indicative of the attribute, and an index of a plurality of attribute parameters associated with the keyword, with each such attribute parameter of a first graphic format being paired with an attribute parameter of a second graphics format; with apparatus for bi-directional transmission of the converted graphic formats between said first and second applications; said method comprising the steps of:

selecting a predetermined attribute parameter of said first graphics format for conversion to said second graphics format;

scanning said attribute parameters of said first graphics format until the predetermined attribute selected for conversion is found; and selecting the attribute parameter of said second graphics format that is paired with the predetermined attribute selected for conversion to said second graphics format, as a converted attribute.

6. A method of operating a computer system comprised of a computer; a first application running on said computer which utilizes a first graphics format for transmitting and receiving graphics information; a second application running on said computer which utilizes a second graphics format, which is different than said first graphics format, for transmitting and receiving graphics information; a bi-directional format conversion table for converting said first graphics format to said second graphics format and vice versa; with said conversion table including an attribute profile for at least two graphic formats, which said attribute profile including for each of a plurality of attributes for each of said at least two graphic formats: a prefix indicative of a graphic format, a keyword indicative of the attribute, and an index of a plurality of attribute parameters associated with the keyword, with each such attribute parameter of a first graphic format being paired with an attribute parameter of a second graphics format; with apparatus for bi-directional transmission of the converted graphics formats between said first and second applications; said method comprising the steps of:

selecting a predetermined attribute parameter of said first graphics format for conversion to said second graphics format;

scanning said attribute parameters of said first graphics format until the predetermined attribute selected for conversion is found; and selecting the attribute parameter of said second graphics format that is paired with the predetermined attribute selected for conversion to said second graphics format, as the converted attribute.

* * * * *